US009749189B2

(12) United States Patent
Maity et al.

(10) Patent No.: US 9,749,189 B2
(45) Date of Patent: *Aug. 29, 2017

(54) GENERATING GRAPHICAL DIAGRAM OF PHYSICAL LAYOUT OF COMPUTER PLATFORMS

(71) Applicant: AMERICAN MEGATRENDS, INC., Norcross, GA (US)

(72) Inventors: Sanjoy Maity, Snellville, GA (US); Purandhar Nallagatla, Johns Creek, GA (US); Baskar Parthiban, Johns Creek, GA (US); Harikrishna Doppalapudi, Norcross, GA (US); Ramakoti Reddy Bhimanadhuni, Suwanee, GA (US); Satheesh Thomas, Norcross, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 234 days.

This patent is subject to a terminal disclaimer.

(21) Appl. No.: 14/320,936

(22) Filed: Jul. 1, 2014

(65) Prior Publication Data
US 2016/0006619 A1   Jan. 7, 2016

(51) Int. Cl.
*G06F 15/177* (2006.01)
*H04L 12/24* (2006.01)

(52) U.S. Cl.
CPC .................................... *H04L 41/22* (2013.01)

(58) Field of Classification Search
CPC .................................. H04L 41/22; G06F 3/048
See application file for complete search history.

(56) References Cited

U.S. PATENT DOCUMENTS

| | | | |
|---|---|---|---|
| 6,788,315 B1 * | 9/2004 | Kekic | H04L 41/0681 709/203 |
| 2003/0101261 A1 * | 5/2003 | Ikeda | H04L 41/0213 709/224 |
| 2009/0013258 A1 * | 1/2009 | Hintermeister | G06F 11/328 715/736 |
| 2010/0228960 A1 | 9/2010 | Huang et al. | |
| 2014/0365641 A1 * | 12/2014 | Cho | G06F 13/4022 709/224 |
| 2015/0195191 A1 * | 7/2015 | Inoue | G06F 15/17362 709/239 |

* cited by examiner

*Primary Examiner* — Thanh Vu
(74) *Attorney, Agent, or Firm* — Locke Lord LLP; Tim Tingkang Xia, Esq.

(57) ABSTRACT

In one aspect, a system includes a service processor (SP), having a processor, a non-volatile memory and a communication interface. The SP receives a component information of components of a host computer from a basic input/output system (BIOS) being executed at a central processing unit (CPU) of the host computer through the communication interface, and stores the received component information in the non-volatile memory. When the SP receives an instruction to display a physical layout of the components of the host computer, the SP retrieves the component information for each of the components stored in the non-volatile memory, and generates corresponding display information for each of the components based on the retrieved component information. Then the SP may send the display information to a remote management computer to display a graphical diagram of the physical layout on a display device at the remote management computer.

26 Claims, 5 Drawing Sheets

GENERATING GRAPHICAL DIAGRAM OF PHYSICAL LAYOUT OF COMPUTER PLATFORMS

FIELD

The present disclosure relates to computer technology, and particularly to a system and method of generating graphical diagrams of the physical layout of computer platforms using a service processor (SP).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Generally, a computer system has multiple components, such as chips, boards and devices, enclosed by a chassis. However, different computer platforms may have different layouts of the components. As the computer system grows complex, it is difficult for system engineers to locate the devices and components for troubleshooting or device replacing purposes. For example, when an engineer suspects that a jumper of the computer is out of order and needs to be replaced, the engineer needs to locate the jumper. The layout information of the computer system is generally required as a guide for the engineer to work with the correct component.

Therefore, an unaddressed need exists in the art to address the aforementioned deficiencies and inadequacies.

SUMMARY

Certain aspects of the present disclosure direct to a system, which includes a SP. The SP has a processor, a non-volatile memory and a communication interface. The non-volatile memory stores computer executable code. The code, when executed at the processor, is configured to: receive, from a basic input/output system (BIOS) being executed at a central processing unit (CPU) of a host computer through the communication interface, component information of components of the host computer; store the received component information in the non-volatile memory; in response to an instruction to display a physical layout of the components of the host computer, retrieve the component information for each of the components stored in the non-volatile memory, and generate corresponding display information for each of the components based on the retrieved component information; and send the display information to a remote management computer to display a graphical diagram of the physical layout on a display device at the remote management computer.

In certain embodiments, the communication interface is a standardized system interface under an Intelligent Platform Management Interface (IPMI) standard, wherein the standardized interface includes a keyboard controller style (KCS) interface, a system management interface chip (SMIC) interface, and a block transfer (BT) interface, or a universal serial bus (USB) interface.

In certain embodiments, the SP is a baseboard management controller (BMC).

In certain embodiments, for each of the components, the component information includes at least one of presence information indicating presence or absence of the component, identifier information indicating a type of the component, and status information indicating a status of the component. In certain embodiments, the status of each of the components includes at least one of functional status, enabling status, and health status.

In certain embodiments, the components of the host computer include at least one of the CPU, at least one memory module, at least one peripheral component interconnect (PCI) module, at least one storage device, and at least one power supply unit (PSU).

In certain embodiments, the host computer includes a BIOS chip storing the BIOS and the component information. The BIOS, when executed at the CPU, is configured to: detect each of the components, and receive corresponding information for each of the components, store corresponding information for each of the components in the BIOS chip as the component information, and retrieve the component information from the BIOS chip, and send the component information to the SP through the communication interface.

In certain embodiments, the BIOS is configured to send the component information to the SP in a form of a first IPMI original equipment manufacturer (OEM) message. In certain embodiments, the code is configured to receive the component information by receiving the first IPMI OEM message, and retrieving the component information from the first IPMI OEM message.

In certain embodiments, the remote management computer includes a graphical user interface (GUI), which is configured to: receive an input command to display the physical layout of the components of the host computer; in response to the input command, generate the instruction to display the physical layout of the components of the host computer, and send the instruction to the SP; receive the display information from the SP; and display the graphical diagram of the physical layout on the display device based on the display information.

Certain aspects of the present disclosure direct to a method of generating a graphical diagram of a physical layout of components of a host computer. In certain embodiments, the method includes: receiving, at a SP, component information of components of the host computer from a BIOS being executed at a CPU of the host computer through a communication interface; storing, at the SP, the received component information in a non-volatile memory of the SP; in response to an instruction to display the physical layout of the components of the host computer, retrieving, by the SP, the component information for each of the components stored in the non-volatile memory, and generating corresponding display information for each of the components based on the retrieved component information; and sending, by the SP, the display information to a remote management computer to display a graphical diagram of the physical layout on a display device at the remote management computer.

In certain embodiments, for each of the components, the component information includes at least one of presence information indicating presence or absence of the component, identifier information indicating a type of the component, and status information indicating a status of the component. In certain embodiments, the status of each of the components includes at least one of functional status, enabling status, and health status.

In certain embodiments, the components of the host computer include at least one of the CPU, at least one memory module, at least one peripheral component interconnect (PCI) module, at least one storage device, and at least one power supply unit (PSU).

In certain embodiments, the host computer includes a BIOS chip storing the BIOS and the component information. The BIOS, when executed at the CPU, is configured to: detect each of the components, and receive corresponding information for each of the components, store corresponding information for each of the components in the BIOS chip as the component information, and retrieve the component information from the BIOS chip, and send the component information to the SP through the communication interface.

In certain embodiments, the BIOS is configured to send the component information to the SP in a form of a first IPMI OEM message. In certain embodiments, the code is configured to receive the component information by receiving the first IPMI OEM message, and retrieving the component information from the first IPMI OEM message.

In certain embodiments, the remote management computer includes a GUI, which is configured to: receive an input command to display the physical layout of the components of the host computer; in response to the input command, generate the instruction to display the physical layout of the components of the host computer, and send the instruction to the SP; receive the display information from the SP; and display the graphical diagram of the physical layout on the display device based on the display information.

Certain aspects of the present disclosure direct to a non-transitory computer readable medium storing computer executable code. The code, when executed at a processor of a SP, is configured to: receive, at the SP, component information of components of a host computer from a basic input/output system (BIOS) being executed at a central processing unit (CPU) of the host computer through the communication interface; store, at the SP, the received component information in a non-volatile memory of the SP; in response to an instruction to display a physical layout of the components of the host computer, retrieve, by the SP, the component information for each of the components stored in the non-volatile memory, and generate corresponding display information for each of the components based on the retrieved component information; and send, by the SP, the display information to a remote management computer to display a graphical diagram of the physical layout on a display device at the remote management computer.

In certain embodiments, for each of the components, the component information includes at least one of presence information indicating presence or absence of the component, identifier information indicating a type of the component, and status information indicating a status of the component. In certain embodiments, the status of each of the components includes at least one of functional status, enabling status, and health status.

In certain embodiments, the components of the host computer include at least one of the CPU, at least one memory module, at least one peripheral component interconnect (PCI) module, at least one storage device, and at least one power supply unit (PSU).

In certain embodiments, the host computer includes a BIOS chip storing the BIOS and the component information. The BIOS, when executed at the CPU, is configured to: detect each of the components, and receive corresponding information for each of the components, store corresponding information for each of the components in the BIOS chip as the component information, and retrieve the component information from the BIOS chip, and send the component information to the SP through the communication interface.

In certain embodiments, the BIOS is configured to send the component information to the SP in a form of a first IPMI OEM message. In certain embodiments, the code is configured to receive the component information by receiving the first IPMI OEM message, and retrieving the component information from the first IPMI OEM message.

In certain embodiments, the remote management computer includes a GUI, which is configured to: receive an input command to display the physical layout of the components of the host computer; in response to the input command, generate the instruction to display the physical layout of the components of the host computer, and send the instruction to the SP; receive the display information from the SP; and display the graphical diagram of the physical layout on the display device based on the display information.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code," as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors of various architectures. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

The present disclosure is directed to a computer system, which utilizes a service processor (SP) to generate graphical diagrams of the physical layout of computer platforms.

Figure 1:
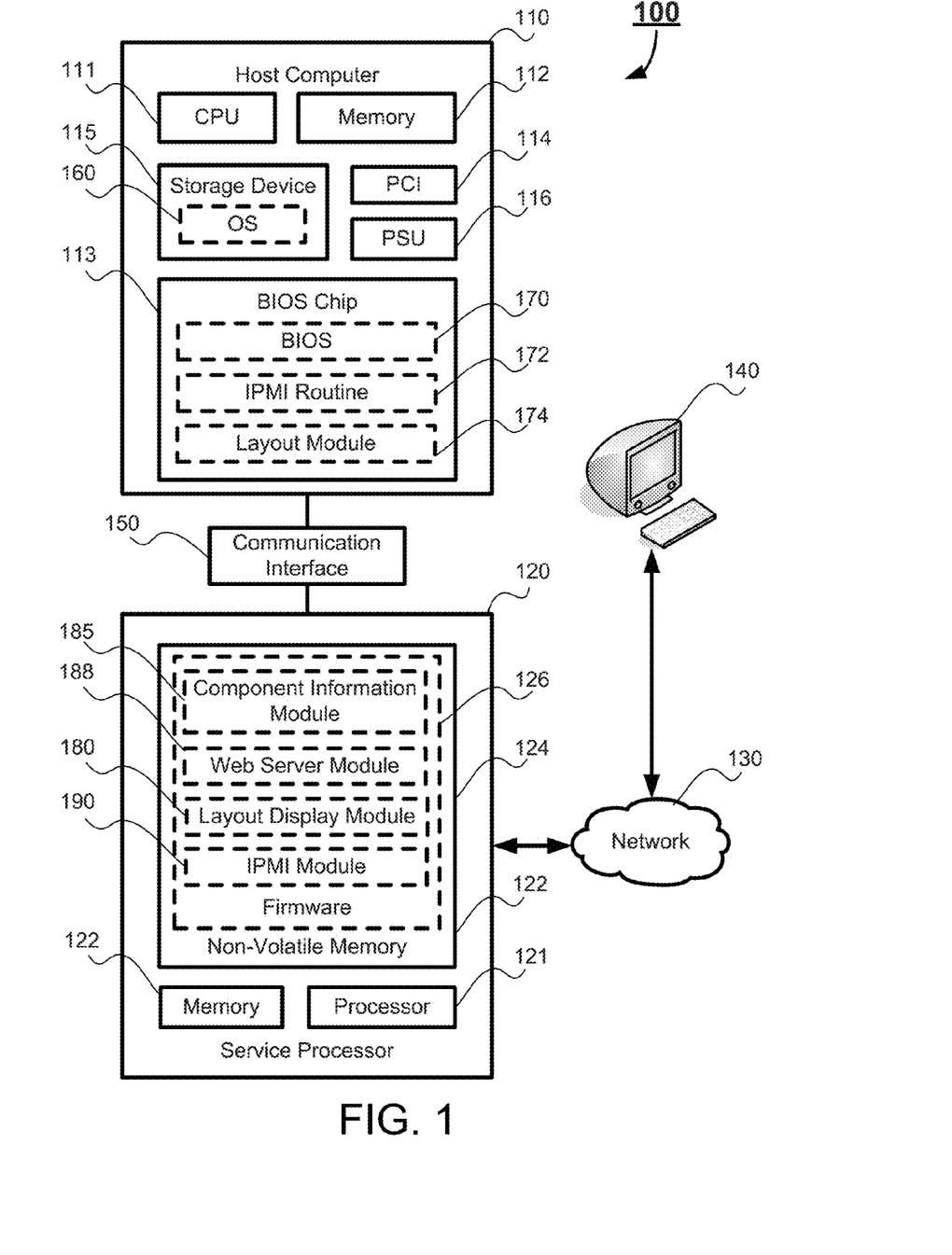
FIG. 1 schematically depicts a computer system in accordance with certain embodiments of the present disclosure.

FIG. 1 schematically depicts a computer system according to certain embodiments of the present disclosure. As shown in FIG. 1, the computer system 100 includes a host computer 110 and a SP 120. The SP 120 is connected to the host computer 110 via a communication interface 150. In certain embodiments, the computer system 100 may include other physical or virtual components not shown in FIG. 1. In certain embodiments, the host computer 110 may include at least one I/O device (not shown) for generating and controlling input and output signals of the host computer 110. Examples of the I/O device include keyboards, touch pads, mouse, microphones, display screens, touch screens, or other I/O devices applicable for the host computer 110. Some I/O devices, such as touch screens, are provided for the dual input/output purposes.

The communication interface 150 is an interface where communication between the host computer 110 and the SP 120 passes therethrough. In certain embodiments, the communication interface 150 can be a typical standardized Intelligent Platform Management Interface (IPMI) system interfaces, such as a keyboard controller style (KCS) interface, a system management interface chip (SMIC) interface or a block transfer (BT) interface. In certain embodiments, the communication interface 150 can be other interfaces, such as a universal serial bus (USB) interface. In certain embodiments, the SP 120 may be connected to the host computer 110 via one or more communication interfaces 150. In certain embodiments, data transfer between the host computer 110 and the SP 120 can be in the format of IPMI original equipment manufacturer (OEM) messages, and goes through the communication interface 150.

The KCS interface is a standardized interface often used between a SP and a payload processor in the IPMI architecture. IPMI is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a SP through an operating system or through an external connection, such as through a network or serial connection. Additional details regarding IPMI can be found in the IPMI Specification (Version 2.0), which is publicly available from INTEL CORPORATION, and which is incorporated herein by reference.

In certain embodiments, in addition to the standard predefined commands and parameters, IPMI allows OEM extensions for the manufacturers and users to define OEM specific commands. A user may use IPMI OEM messages to control data transmission via the KCS interface. The IPMI OEM messages may be used for the data transaction between the host computer 110 and the SP 120. In certain embodiments, the IPMI OEM messages may include the specific data to be transferred, or a request for the specific data.

The USB interface is an industry standardized interface under the USB industry standard that defines the cables, connectors and communications protocols used in a bus for connection, communication, and power supply between computers and electronic devices. In certain embodiments, the USB interface is a USB port.

USB has effectively replaced a variety of earlier interfaces, such as serial and parallel ports, as well as separate power chargers for portable devices. Currently, USB allows bi-directional communications between the host computer 110 and the SP 120, as USB 3.0 allows for device-initiated communications towards the host. In certain embodiments, the USB interface may be used to transfer IPMI OEM messages between the host computer 110 and the SP 120.

In certain embodiments, a remote management computer 140 may be connected to the host computer 110 and/or the SP 120 via a network 130. The system 100 can be a system that incorporates more than one interconnected system, such as a client-server network. The network 130 may be a wired or wireless network, and may be of various forms such as a local area network (LAN) or wide area network (WAN) including the Internet.

The host computer 110 is the computer platform containing the components. In certain embodiments, the host computer 110 may be a computing device, such as a general purpose computer or a headless computer. Generally, the host computer 110 includes a baseboard or the "motherboard" (not shown) enclosed by a chassis (not shown). The baseboard is a printed circuit board to which a multitude of components or devices may be connected by way of a system bus or other electrical communication paths. Although not explicitly shown in FIG. 1, the components on the baseboard are interconnected, and the physical layout of the components on the baseboard and the manner of the interconnection between the components on the baseboard is herein referred to as the configuration of the baseboard. One of ordinary skill in the art would appreciate that the configuration of the baseboard may be adjusted or changed according to the necessary design or manufacturing requirements.

The components of the host computer 110 include, but not limited to, a central processing unit (CPU) 111, a memory module 112, a BIOS chip 113, a peripheral component interconnect (PCI) module 114, a storage device 115, a power supply unit (PSU) 116, and other required memory and Input/Output (I/O) modules (not shown). In certain embodiments, a plurality of each of the components may be provided. For example, a host computer 110 may have multiple CPU's 111, multiple memory modules 112, multiple PCI modules 114, and multiple storage devices 115. In certain embodiments, the SP 120 may also be a component physically installed on the baseboard of the host computer 110.

In certain embodiments, the CPU 111, the memory module 112, the BIOS chip 113, the PCI module 114, the storage device 115, and the PSU 116 may be embedded on the baseboard, or may be connected to the baseboard through at least one interface. In certain embodiments, the interface may be physical hardware interface such as electrical connectors, buses, ports, cables, terminals, or other I/O devices. In certain embodiments, each of these physical hardware interfaces may be in the form of a slot on the baseboard of the host computer 110 for the corresponding component to be inserted therein.

The CPU 111 is a host processor which is configured to control operation of the host computer 110. The host processor can execute an operating system (OS) 160 or other applications, which is stored in the storage device 115 of the host computer 110. In certain embodiments, the host computer 110 may run on or more than one CPU as the host processor, such as two CPUs, four CPUs, eight CPUs, or any suitable number of CPUs.

The memory module 112 can be a volatile memory, such as the random-access memory (RAM), for storing the data and information during the operation of the host computer 110. In certain embodiments, the memory module 112 is in communication with the CPU 111 through a system bus (not shown). For example, the memory module 112 may be a dual in-line memory module (DIMM), which includes a series of dynamic RAM ICs. The DIMM may be connected to the baseboard by being inserted into a DIMM slot connected to the system bus.

The PCI module 114 is an interface module in connection with the peripheral devices of the host computer 110. Examples of the peripheral devices may include, but not limited to, the I/O devices for generating and controlling input and output signals of the host computer 110. In certain embodiments, the PCI module 114 may be connected to the baseboard by being inserted in a PCI expansion slot (also known as the PCI socket).

The storage device 115 stores a plurality of software applications, including the OS 160. In certain embodiments, the storage device 115 may be a hard disk drive, a floppy disk drive, an optical disk drive, or any other physical storage media. The OS 160 can be collective management software managing the operation of the host computer 110. For example, the OS 160 can include a set of functional programs that control and manage operations of the devices connected to the host computer 110. The set of application programs provide certain utility software for the user to manage the host computer 110. In certain embodiments, the OS 160 is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc.

The PSU 116 is a unit supplying power for the host computer 110. In certain embodiments, the PSU 116 is connected to a power source (not shown). In certain embodiments, the power source may be an AC power source or a DC power source, such as a battery.

In certain embodiments, the BIOS chip 113 is a nonvolatile memory, such as a flash memory chip, an electrically erasable programmable read-only memory (EEPROM) chip or a complementary metal oxide semiconductor (CMOS) memory. As shown in FIG. 1, the BIOS chip 113 stores a Basic Input/Output System (BIOS) 170, an IPMI routine 172, and a layout module 174.

The BIOS 170 includes the firmware code which, when executed at the CPU 111, are configured to perform the startup functions, or the booting functions, for the host computer 110. Examples of the booting functions include, but are not limited to, the initiation and power-on self-test, identifying the system devices, locating the boot loader software on the boot device, loading and executing the boot loader software and giving it control of the OS 160.

As described above, the BIOS 170 can perform the startup or the booting functions. In the booting process, the BIOS 170 performs a power-on self-test (POST) operation, which initializes and identifies the system hardware devices and components of the host computer 110, such as the CPU 111, the memory module 112, the PCI module 114, the storage device 115, peripheral I/O devices such as display card, keyboard and mouse, and other hardware devices. In certain embodiments, the BIOS 170 may identify the storage device 115, which stores the OS 160, as a bootable device. Once the BIOS 170 completes the self-test operation, the BIOS 170 then attempts to boot the host computer 110, i.e., instructs the CPU 111 to read and execute the OS 160 from the bootable device, i.e. the storage device 115 as specified in the BIOS 170. Typically, the BIOS 170 attempts to load a boot loader program from the storage device 115. The boot loader program then loads the OS 160 from the storage device 118. Thus, the CPU 111 can execute the OS 160 and run an instance of the OS 160. At the end of the booting process, the control of the computer system is given to the OS 160.

In certain embodiments, during the BIOS initialization process, the BIOS 170 identifies the system hardware devices and components of the host computer 110 by detecting and communicating with each of the components on the motherboard based on component information stored in the layout module 174. Specifically, each of the components contains configuration data, and the configuration data include an identifier that is specifically made for identification of the component. Each of the components may use a different communication protocol to communicate with the BIOS 170 such that the BIOS 170 may perform the POST operation with the components. For example, the BIOS 170 may communicate with the CPU 111 using an interrupt request (IRQ). When the BIOS 170 needs the attention of the CPU 111, the BIOS 170 controls an interrupt controller program to send the IRQ to the CPU 111, and the CPU 111 is temporarily put on hold with the operation it is working on to process the IRQ. In response to the IRQ from the BIOS, the CPU 111 retrieves certain data (e.g. the identifier) contained in the configuration data, and sends the retrieved data to the BIOS 170 for identifying the CPU 111.

In certain embodiments, after completing the self-test operation without errors, the BIOS 170 may perform a communication process with the SP 120 to transfer the component information stored in the layout module 174 to the SP 120. In certain embodiments, when the BIOS 170 completes the self-test operation successfully, the BIOS 170 may retrieve the component information from the layout module 174, and send a copy of the component information to the SP 120. In certain embodiments, when the BIOS 170 completes the POST operation successfully, the BIOS 170 may send a notification to the SP 120 to initiate a data transaction with the SP 120. In certain embodiments, the notification may be in the form of an IPMI OEM message. Upon receiving a response to the notification from the SP 120, the BIOS 170 sends a copy of the component information stored in the layout module 174 to the SP 120.

The IPMI routine 172 is a computer routine that generates and processes IPMI messages. In certain embodiments, when the BIOS 170 is executed at the CPU 111 in the booting process, the BIOS 170 may send data to the IPMI routine 172 for converting the data between IPMI messages and data recognizable by the BIOS 170. In certain embodiments, the IPMI routine 172 may receive data from the BIOS 170, and converts the received data to generate corresponding IPMI messages. For example, when the BIOS 170 intends to send the component information stored in the layout module 174 to the SP 120, the BIOS 170 retrieves the component information from the layout module 174, and sends data of the component information to the IPMI routine 172. Upon receiving the data of the notification, the IPMI routine 172 converts the data to an IPMI OEM message representing the notification, and sends the IPMI OEM message to the SP 120 through the communication interface 150. When the IPMI routine 172 receives IPMI OEM messages from the SP 120 or any other peripheral devices, the IPMI routine 172 processes the IPMI OEM messages to generate data recognizable by the BIOS 170, and then sends the data back to the BIOS 170 for further process.

In certain embodiments, the IPMI routine 172 is separated from the BIOS 170 as an independent program. In certain embodiments, the IPMI routine 172 can be a part of the BIOS 170, which is compatible to the IPMI architecture for generating IPMI messages.

The layout module 174 stores the component information of the components of the host computer 110. In certain embodiments, the layout module 174 may pre-store data identifying all components that may be installed on the baseboard. For example, the baseboard may have multiple slots for each of the components that may be installed thereon, such as multiple CPU modules for the CPU 111, multiple memory slots for the memory modules 112, and multiple PCI expansion slots for the PCI modules 116. In this case, the layout module 174 may include pre-stored data corresponding to each of the slots such that the BIOS 170 may perform the POST operation based on the pre-stored data in the layout module 174.

In certain embodiments, the component information includes information corresponding to a physical layout of the motherboard and information corresponding to each component that may be installed on the motherboard. In certain embodiments, the information corresponding to each component may include location information indicating the location of the component on the motherboard and presence information indicating that the component is present or absent. In other words, the location information and the presence information functions as a blueprint of the motherboard, which may be used by a graphical processing module to generate a graphical diagram of the physical layout of the components on the motherboard. In certain embodiments, the presence information may use a single bit of data to indicate whether the component is present or absent. For example, the presence information may include a first bit. When the first bit is "1", it indicates that the component is present, and when the first bit is "0", it indicates that the component is absent. In certain embodiments, when the BIOS 170, based on the pre-stored data in the layout module 174, attempt to detect a memory module 112, the BIOS 170 may send a detecting signal to the bus connected to corresponding memory slot of the memory module 112 to be detected. If the memory module 112 is installed in the memory slot, the memory module 112 may respond to the detecting signal by sending back to the BIOS 170 a globally unique identifier (GUID) for identifying the memory module 112. The GUID is a unique 128-bit integer number used by certain commercial applications (e.g. the Microsoft Windows OS or Windows applications) to identify a particular hardware or software component. Upon receiving the GUID from the memory module 112, the BIOS 170 may store component data corresponding to the memory slot in the layout module 174 using a first bit "1" to indicate that a component (i.e. the memory module 112) is present in the corresponding slot, and the GUID of the memory module 112 to indicate that the memory module 112 corresponding to the GUID is the component installed in the corresponding slot. On the other hand, if the BIOS 170 does not receive any response in detecting the memory module 112, the BIOS 170 may store component data corresponding to the memory slot in the layout module 174 using a first bit "0" to indicate that no component is present in the corresponding slot, and a blank string, which corresponds to the non-existing component in the corresponding slot.

In certain embodiments, the information corresponding to each component may further include status information indicating the status of the component. Example of the status of the component may include the functional status (whether the component is functional or non-functional), enabling status (whether the component is enabled or disabled), or health status (whether the component is constantly operational without errors, or occasionally generates errors, etc.). In certain embodiments, the information corresponding to each component may include other configuration information corresponding to the configuration data of the component.

In certain embodiments, the status information may use one or more bits of data to indicate the status of the component. For example, the status information may include two bits of data, which include a second bit indicating the enabling status and a third bit indicating the health status. For the second bit indicating the enabling status, "1" indicates that the component is enabled, and "0" indicates that the component is disabled. For the third bit indicating the health status, "1" indicates that the component is in good health (constantly operational without errors), and "0" indicates that the component is not in good health (occasionally generating errors). When both the second and third bits are "1", the component is enabled and healthy, and is thus functional. If at least one of the second and third bits is "0", the component is non-functional. In certain embodiments, when the BIOS 170, based on the pre-stored data in the layout module 174, sends a detecting signal to the bus connected to corresponding memory slot of the memory module 112 to detect the memory module 112, a fully functional memory module 112 may in response send back to the BIOS 170 with the GUID without any error message. Upon receiving the GUID from the memory module 112, the BIOS 170 may store component data corresponding to the memory slot in the layout module 174 using a first bit "1" to indicate that a component (i.e. the memory module 112) is present in the corresponding slot, and the GUID of the memory module 112 to indicate that the memory module 112 corresponding to the GUID is the component installed in the corresponding slot, and two additional bits added after the GUID: the second bit "1" to indicate that the memory module 112 is enabled, and the third bit "1" to indicate that the memory module 112 is in good health. In certain embodiments, the memory module 112 may be disabled. In this case, the second bit of the component information may be set to "0" to indicate that the memory module 112 is disabled, and the other parts of the component information remains the same. In certain embodiments, the memory module 112 may be a broken module. In this case, the third bit of the component information may be set to "0" to indicate that the memory module 112 is in bad health, and the other parts of the component information remain the same.

Figure 2A:
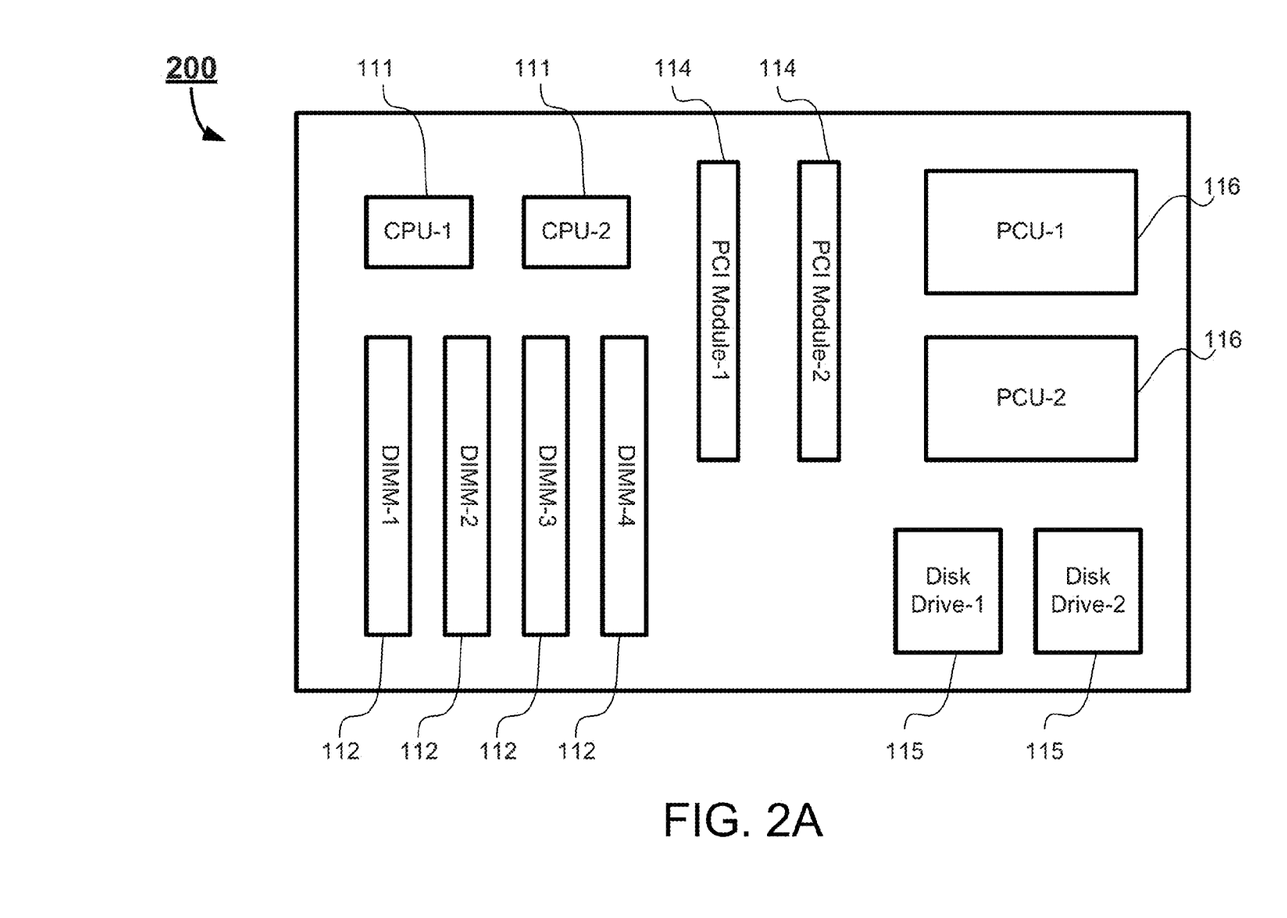
FIG. 2A schematically depicts a top view of the physical layout of components on a baseboard of a host computer in accordance with certain embodiments of the present disclosure.

FIG. 2A schematically depicts a top view of the physical layout of components on a baseboard of a host computer in accordance with certain embodiments of the present disclosure. As shown in FIG. 2A, a baseboard 200 has a plurality of slots thereon, and each slot may be configured to match a corresponding component. For example, when all of the slots on the baseboard 200 are occupied, the components includes two CPUs 111, four DIMM's as memory modules 112, two PCI modules 114, two disk drives as storage devices 115, and two PSU's 116. In certain embodiments, one or more slots may be empty without a corresponding component being installed therein.

As shown in FIG. 2A, each component has a corresponding location on the baseboard 200, which is recorded as a part of the component information in the layout module 174. In other words, the layout module 174 can store a "complete" layout of the baseboard 200 with all slots having a corresponding component installed therein. Each component also stores an identifier for the purpose of identifying the component. For example, each of the two CPU's 111 may use a corresponding GUID to identify the CPU 111. It should be appreciated that for each component, the identifiers may be the same or different identifiers. For example, the GUID, which is non-hierarchical, may be used as the identifier of the CPUs 111 and the memory modules 112. In certain embodiments, the hierarchical numbers or other types of identification data may be used as the identifiers for certain components. For example, the storage devices 115 and the PSU 116 may use sequential letters and numbers as the identifiers.

As discussed above, during the BIOS initialization process, the BIOS 170 identifies the system hardware devices and components of the host computer 110 by detecting and communicating with each of the components on the baseboard 200 based on component information stored in the layout module 174. When the BIOS 170 starts the POST operation, the BIOS 170 reads from the layout module 174 the component information, which contains a complete layout of the baseboard 200 with all the slots having a corresponding component to be installed therein, and the information of the communication link and communication protocol used for each component. For example, in computer system having the baseboard 200 as shown in FIG. 2A, the BIOS 170 may recognize, based on the component information stored in the layout module 174, that the baseboard 200 has 12 slots, including two slots corresponding to two CPUs 111, four DIMM slots corresponding to four DIMM's 112, two PCI expansion slots corresponding to two PCI modules 114, two disk drive interfaces corresponding to two disk drives 115, and two power supply interface corresponding to two PSU's 116. The BIOS 170 also recognize the location information of each of the slots, and the information of the communication link and communication protocol used for each component. Then the BIOS 170 may start detecting each of the components corresponding to the slots by sending a detecting signal through the proper communication link using the corresponding protocol to communicate with the component.

In certain embodiments, each of the components may use different corresponding protocols and communication links for communication with the BIOS 170. For example, a typical PCI module 114 may be in the form of a PCI Express (PCIe) communication card, which uses computer serial ports to communicate with the BIOS 170 under the RS-232/

422/485 serial communication protocols. Storage devices such as hard disks may use different communication links and protocols to communicate with the BIOS 170, such as the integrated drive electronics (IDE) interface, serial advanced technology attachment (SATA) interface, small computer system interface (SCSI), or the universal serial bus (USB) interface.

Once the BIOS 170 sends the detecting signal to a corresponding component, the BIOS 170 may wait for a certain period of time for the response from the component. When the BIOS 170 receives a response, the BIOS 170 may determine that the component is present, and update the component information corresponding to the slot in the layout module 174 based on the response to indicate the component. If the BIOS 170 does not receive any response for the certain period of time, the BIOS 170 may determine that the component is absent (i.e., the slot is an empty slot), and update component information corresponding to the slot in the layout module 174 to indicate that the slot is empty.

In certain embodiments, instead of storing a complete layout of all the slots on the baseboard 200, the layout module 174 may only store information of essential components of the baseboard 200. In certain embodiments, the layout module 174 may store only information of a slot corresponding to a first CPU 111, without having the information of other components such as the second CPU 111 and the DIMM's 112. All other information of these components (the second CPU 111 and the DIMM's 112) can be determined based on the information of the first CPU 111. For example, the layout module 174 may store only information of all models of CPU models and CPU identifiers. In this case, the BIOS 170 may read the information of the slot corresponding to the first CPU 111, and perform detection of the first CPU 111. Once the first CPU 111 is detected, the BIOS may obtain the information of the first CPU 111 based on the response from the first CPU 111. Since a CPU 111 of a certain model may support a certain number of additional CPU's 111 and DIMM's 112, the BIOS 170 may then perform additional detection to detect the presence of these additional components. For example, if the BIOS 170 determines, based on the detection of the first CPU 111, that the first CPU 111 may support one additional CPU and four DIMM's, the BIOS 170 may then start detecting if the baseboard has one additional CPU and four DIMM without knowing the locations of the slots corresponding to these additional components. In other words, the BIOS 170 may dynamically detect these components even though the layout module 174 does not pre-store location information corresponding to these components.

The SP 120 is a specialized microcontroller that manages the interface between system management software and platform hardware. In certain embodiments, the SP 120 may be a baseboard management controller (BMC). Different types of sensors can be built into the host computer 110, and the SP 120 reads these sensors to obtain parameters such as temperature, cooling fan speeds, power status, OS status, etc.

The SP 120 monitors the sensors and can send out-of-band (OOB) alerts to a system administrator of the host computer 110 if any of the parameters do not stay within preset limits, indicating a potential failure of the host computer 110. In certain embodiments, the administrator can also remotely communicate with the SP 120 from a remote management computer via a network to take remote action to the host computer. For example, the administrator may reset the host computer 110 from the remote management computer through the SP 120, and may obtain system information of the host computer 110 OOB without interrupting the operation of the host computer 110.

As shown in FIG. 1, the SP 120 includes a processor 121, a memory 122 and a non-volatile memory 124. In certain embodiments, the SP 120 may include other components, such as at least one I/O device (not shown).

The processor 121 controls operation of the SP 120. The processor 121 can execute the firmware 126 or other code stored in the SP 120. In certain embodiments, the SP 120 may run on or more than one processor.

The memory 122 can be a volatile memory, such as the RAM, for storing the data and information during the operation of the SP 120. When the SP 120 restarts, the contents stored in the memory 122 will be lost.

The non-volatile memory 124 stores the firmware 126 of the SP 120. The firmware 126 of the SP 120 includes computer executable code for performing the operation of the SP 120. As shown in FIG. 1, the firmware 126 of the SP 120 includes, among other things, a layout display module 180, a component information module 185, a web server module 188, and an IPMI module 190. Optionally, the firmware 126 may also include a watchdog module (not shown) for monitoring operation of the host computer 110.

The layout display module 180 is a firmware module configured to generate display information based on the component information contained in the component information module 185. The display information contains information for drawing a graphical diagram of the physical layout of the baseboard of the host computer 110, which may be used by a graphical user interface (GUI) at the remote management computer 140 to display the graphical diagram on a display device of the remote management computer 140. An administrator of the computer system 100 may operate the GUI at the remote management computer 140 to display the graphical diagram, and recognize the information of the components from the graphical diagram.

In certain embodiments, when an administrator of the computer system 100 intends to see the physical layout of the baseboard of the host computer 110, the administrator may operate the GUI at the remote management computer 140 to send an instruction to the SP 120 via the network 130. At the SP 120, when the layout display module 180 receives the instruction, the layout display module 180 retrieves the component information of the components from the component information module 185, and generates display information for each component based on the component information of each component. The layout display module 180 then sends the display information to the GUI via the network 130, such that the GUI may display the graphical diagram of the physical layout of the motherboard on a display device based on the display information.

In certain embodiments, for each of the components, the display information may include image information corresponding to an image of the component, location information corresponding to the relative position of the image on the graphical diagram, and status information related to the status information of the component. In certain embodiments, the remote management computer 140 may store a plurality of image files corresponding to each of the components, and the layout display module 180 may store a list of the image files stored at the remote management computer 140. When the layout display module 180 retrieves the component information of one component, the layout display module 180 may recognize the type of the component and the location of the component based on the identifier of the component information. For example, when the layout display module 180 recognizes from the component information of a component that the identifier of the component is a GUID of a first CPU 111, and that the component is both enabled and in good health, the layout display module 180 may determine that the image of the component may be an image of a CPU 111, the location of the component is at a location corresponding to the first CPU 111, and the status of the component is functional. Thus, the layout display module 180 may generate the display information of the component, which include the image information indicating the file of the image of a CPU 111, the location information indicating the relative position of the CPU 111 on the graphical diagram, and the status information of the CPU 111 indicating that the component is both enabled and in good health.

Figure 2B:
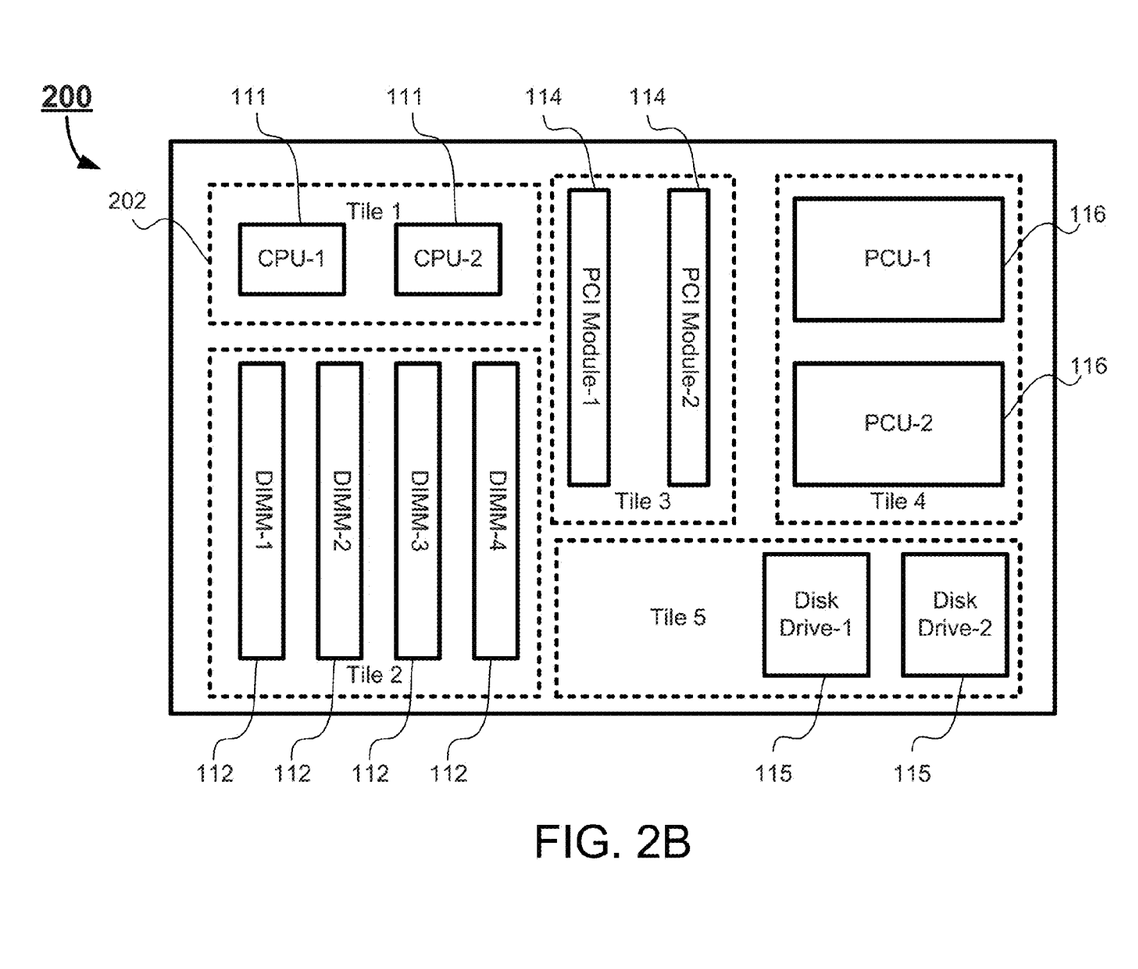
FIG. 2B schematically depicts a graphical diagram of the physical layout in accordance with certain embodiments of the present disclosure.

FIG. 2B schematically depicts an example of a graphical diagram of the physical layout in accordance with certain embodiments of the present disclosure. In this example, the graphical diagram shows a complete layout of the components as shown in FIG. 2A. As shown in FIG. 2B, the graphical diagram is divided into a plurality of tiles 202, and each tile 202 corresponds to an area for one type of component. For example, tile 1 represents the area for the CPU 111, tile 2 represents the area for the DIMM's 112, tile 3 represents the area for the PCI modules 114, tile 4 represents the area for the PCU's 116, and tile 5 represents the area for the disk drives 115. Although not explicitly shown in FIG. 2B, each of the tiles 202 may be further divided into sub-tiles for displaying the image of the components. In this case, the display information may use the tiles and sub-tiles to indicate the location where each image file is to be displayed. For example, when the layout display module 180 recognizes from the component information of a component that the component is a CPU 111, the layout display module 180 may generate the display information of the component, which include the image information indicating the file of the image of a CPU 111, the location information indicating a sub-tile of the tile 1 as the area in which the image of the CPU 111 is to be displayed, and the status information of the CPU 111 indicating that the component is both enabled and in good health.

The component information module 185 is a data store storing the component information of the components of the host computer 110. In certain embodiments, the component information stored in the component information module 185 may include the component information received from the BIOS 170.

In certain embodiments, when the BIOS 170 completes the POST operation successfully, the BIOS 170 may retrieve the component information from the layout module 174, and send a copy of the component information to the SP 120. Upon receiving the copy of the component information, the firmware 126 of the SP 120 stores the copy of the component information as the component information module 185, or updates the component information stored in the component information module 185 based on the received copy of the component information. Thus, the component information stored in the component information module 185 at the SP 120 will correspond to the component information stored in the layout module 174 at the host computer 110.

As discussed above, the SP 120 reads from the sensors built into the host computer 110 to obtain parameters of the components of the host computer 110, such as temperature, cooling fan speeds, power status, OS status, etc. When the firmware 126 of the SP 120 receives the parameters, the firmware 126 stores the parameters in a sensor data record (SDR) file, which is separated from the component information module 185. In certain embodiments, the component information module 185 may also contain a copy of the parameters stored in the SDR file as the component information, which may be served as a backup file of the SDR file.

It should be noted that the operation of the component information module 185 is independent from the state of the host computer 110. In other words, information stored in the component information module 185 may be updated OOB regardless of the state of the host computer 110.

The web server module 188 provides communication with the network 130 such that an administrator of the computer system may connect to the SP 120 remotely from the remote management computer 140 via the network 130.

The IPMI module 190 is a program of the SP 120 to generate and process IPMI messages. In certain embodiments, when the firmware 126 of the SP 120 generates data to be transferred to the host computer 110 under the IPMI architecture, the firmware 126 sends the data to the IPMI module 190. Upon receiving the data, the IPMI module 190 converts the data to corresponding IPMI OEM messages, and sends the IPMI OEM messages to the host computer 110 through the communication interface 150. When the firmware 126 receives IPMI OEM messages from the host computer 110 or any other IPMI compatible devices, the IPMI module 190 processes the IPMI OEM messages to generate data recognizable by the firmware 126, and then sends the data back to the firmware 126 for further process. In certain embodiments, the IPMI module 190 can be a similar program to the IPMI routine 172 at the host computer 110.

Currently, almost all firmware of SP's or BMC's available in the market supports the IPMI architecture, and provide a variety of IPMI modules 190. In certain embodiments, the IPMI module 190 can be a part of the firmware 126, which is compatible to the IPMI architecture for generating IPMI messages. In certain embodiments, the IPMI module 190 is separated from the firmware 126 as an independent program.

In certain embodiments, IPMI OEM messages are used for data transaction purposes between the BIOS 170 and the SP 120. When the IPMI module 190 processes data to be transferred to the host computer 110 to generate an IPMI OEM message, the data can be stored in a data field of the IPMI OEM message.

Figure 3:
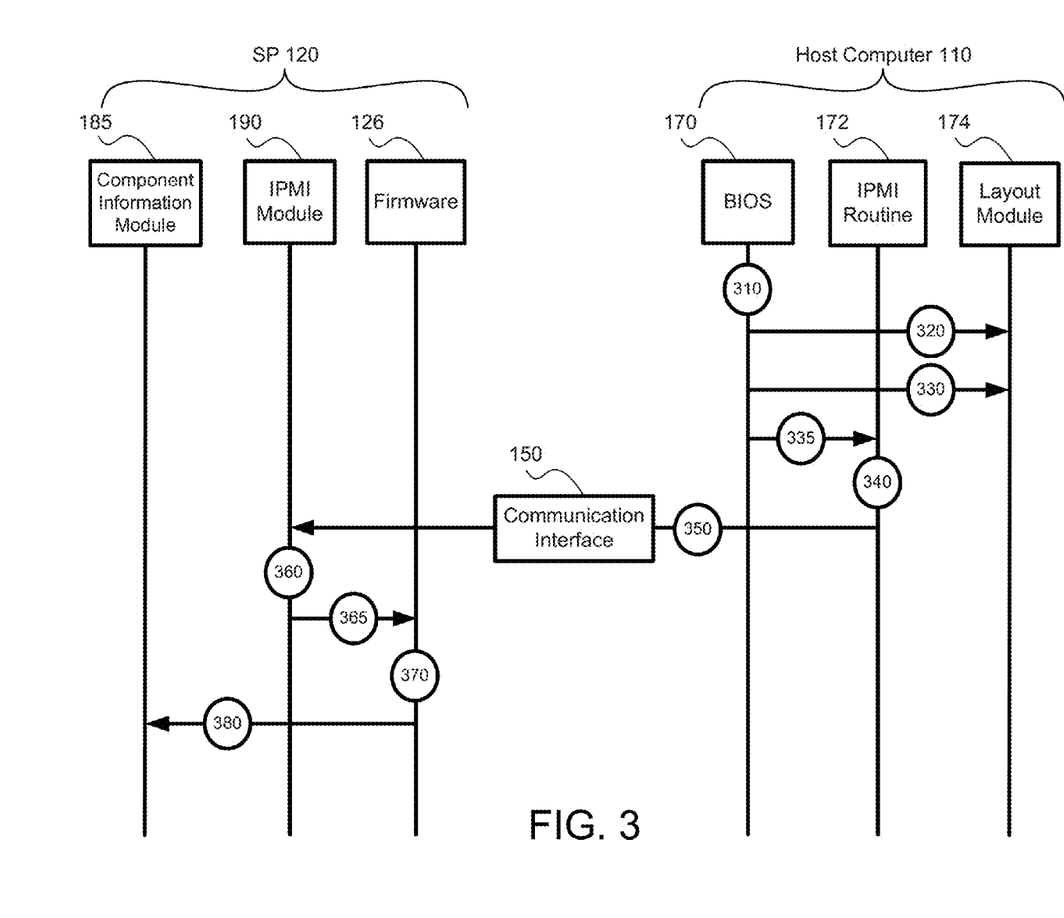
FIG. 3 schematically depicts a component information transaction process from the executed BIOS at the host computer to the SP according to certain embodiments of the present disclosure.

FIG. 3 schematically depicts a component information transaction process from the executed BIOS at the host computer to the SP according to certain embodiments of the present disclosure.

At procedure 310, the host computer 110 boots, and the BIOS 170 performs the booting functions. In the booting process, the BIOS 170 performs the POST operation to initialize and identify the system hardware devices and components of the host computer 110, such as the CPU 111, the memory module 112, the PCI module 114, the storage device 115, the PSU 116, and other peripheral I/O devices such as display card, keyboard and mouse, and other hardware devices. By identifying the devices and the components, the BIOS 170 receives the component information of each of the identified devices and components. For example, for a CPU 111, the component information may include, without being limited to, a first bit "1" indicating that the component (i.e. the CPU 111) is present in the corresponding slot, an identifier (e.g. the GUID of the CPU 111) indicating that the component installed in the slot is a CPU, a second bit "1" indicating that the CPU 111 is enabled, and a third bit "1" indicating that the CPU 111 is in good health. If the component is disabled, the second bit of the component information may be set to "0" to indicate that the component is disabled. If the component is in bad health, the third bit of the component information may be set to "0" to indicate that the component is a bad one. If the BIOS 170 does not detect any response from a corresponding slot, the first bit of the component information may be set to "0" to indicate that no component is detected in the corresponding slot. In certain embodiments, the component information may include other configuration information corresponding to the configuration data of the component. At procedure 320, the BIOS 170 writes the component information of a detected component (or empty slot) received in the POST operation to the layout module 174.

When the POST operation for all components on the baseboard is completed without errors, the BIOS 170 will then send the component information of all components stored in the layout module 174 to the SP 120. At procedure 330, the BIOS 170 retrieves the component information of all components stored in the layout module 174. At procedure 335, the BIOS 170 sends the retrieved component information to the IPMI routine 172 for processing. Upon receiving the notification, at procedure 340, the IPMI routine 172 converts the notification to generate an IPMI OEM message. At procedure 350, the IPMI routine 172 sends the IPMI OEM message representing the component information to the SP 120 through the communication interface 150. It should be appreciated that the communication interface 150 can be a standard system interface, such as a KCS interface, or other interface, such as a USB interface.

At the SP 120, when the IPMI module 190 receives the IPMI OEM message from the host computer 110, at procedure 360, the IPMI module 190 converts the IPMI OEM message to generate the component information, which is recognizable by the firmware 126. At procedure 365, the IPMI module 190 sends the data of the component information back to the firmware 126. Upon receiving the data of the component information, at procedure 370, the firmware 126 recognizes the data represents the component information, At procedure 380, the firmware 126 stores the component information into the component information module 185, or updates the component information stored in the component information module 185 based on the received component information.

Figure 4:
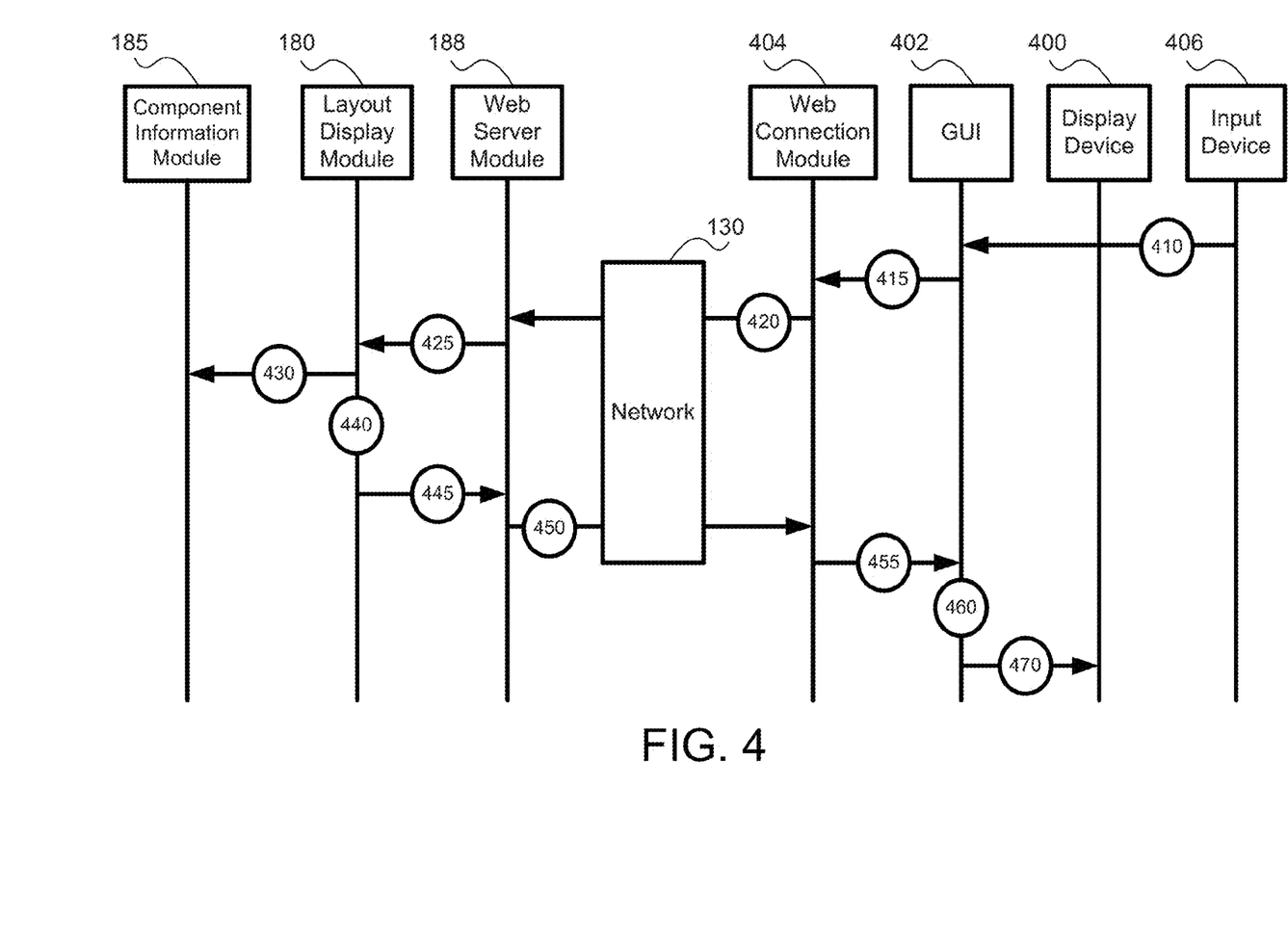
FIG. 4 schematically depicts generating a graphical diagram of the physical layout of the components on the motherboard of the host computer in accordance with certain embodiments of the present disclosure.

FIG. 4 schematically depicts generating a graphical diagram of the physical layout of the components on the motherboard of the host computer in accordance with certain embodiments of the present disclosure. In this embodiment, an administrator may control the SP 120 remotely from the remote management computer 140 and display the graphical diagram at the remote management computer 140. The remote management computer 140 has a display device 400, a GUI 402, a web connection module 404, and an input device 406. The GUI 402 is an application configured to receive input commands from the input device 406 and send display signals to the display device 400 to display an image. The web connection module 404 provides communication with the network 130 such that the remote management computer 140 may be connected to the SP 120 remotely via the network 130. In certain embodiments, the GUI 195 may be a remote module at a remote management computer, which is remotely connected to the SP 120 through a network, and the display device 400 and the input device 405 may also be at the remote management computer.

At procedure 410, an administrator who intends to see the physical layout of the baseboard of the host computer 110 may use the input device 406 at the remote management computer 140 to enter an input command to the GUI 402 for displaying the physical layout. In response to the input command, at procedure 415, the GUI 402 generates an instruction, and sends the instruction to the web connection module 404. At procedure 420, the web connection module 404 sends the instruction to the SP 120 via the network 130.

At the SP 120, when the web server module 188 receives the instruction from the remote management computer 140 via the network 130, at procedure 425, the web server module 188 sends the instruction to the layout display module 180 of the SP 120. Upon receiving the instruction, at procedure 430, the layout display module 180 retrieves the component information from the component information module 185.

At procedure 440, the layout display module 180 processes with the retrieved component information, and generates display information based on the retrieved component information. In certain embodiments, the display information of a component may include the image information indicating the file of the image of the component, the location information indicating the relative position of the image on the graphical diagram, and the status information indicating the status of the component. For example, For example, when the layout display module 180 recognizes from the component information of a component that the component is a CPU 111, the layout display module 180 may generate the display information of the component, which include the image information indicating the file of the image of a CPU 111, the location information indicating a sub-tile of the tile 1 as shown in FIG. 2B as the area in which the image of the CPU 111 is to be displayed, and the status information of the CPU 111 indicating that the component is both enabled and in good health.

When the layout display module 180 generates all of the display information of all components on the baseboard, at procedure 445, the layout display module 180 sends the display information to the web server module 188. At procedure 450, the web server module 188 sends the display information to the remote management computer 140 via the network 130.

At the remote management computer 140, when the web connection module 404 receives the display information from the SP 120 via the network 130, at procedure 455, the web connection module 404 sends the display information to the GUI 402. At procedure 460, the GUI 402 may proceed with the display information to generate a graphical diagram of the physical layout of the baseboard, as shown in FIG. 2B. For example, for a CPU 111, the GUI 402 may retrieve the image of the CPU 111 based on the image information of the display information, and display the image of the CPU 111 at the designated sub-tile of the tile 1 based on the location information. The GUI 402 may also use texts, symbols or colors to display the status of the CPU 111 based on the status information. At procedure 470, the GUI 402 controls the display device 400 to display the graphical diagram of the physical layout. Thus, the administrator may see from the graphical diagram on the display device 400 the physical layout of the components.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a service processor (SP), comprising a processor, a non-volatile memory and a communication interface, wherein the non-volatile memory stores computer executable code configured to, when executed at the processor,
receive, from a basic input/output system (BIOS) being executed at a central processing unit (CPU) of a host computer through the communication interface, component information of components corresponding to slots on a baseboard of the host computer, wherein the slots on the baseboard corresponding to the components are displayable in a physical layout of the slots on the baseboard of the host computer;
store the received component information in the non-volatile memory;
in response to an instruction to display the physical layout, retrieve the component information for each of the components corresponding to the slots stored in the non-volatile memory, and generate corresponding display information for each of the slots corresponding respectively to each of the components based on the retrieved component information; and
send the display information to a remote management computer to display a graphical diagram of the physical layout on a display device at the remote management computer,
wherein for each of the components corresponding to the slots, the component information comprises status information indicating a status of the component, and the status of each of the components corresponding to the slots comprises enabling status.

2. The system as claimed in claim 1, wherein the communication interface is a standardized system interface under an Intelligent Platform Management Interface (IPMI) standard, wherein the standardized interface comprises a keyboard controller style (KCS) interface, a system management interface chip (SMIC) interface, and a block transfer (BT) interface, or a universal serial bus (USB) interface.

3. The system as claimed in claim 1, wherein the SP is a baseboard management controller (BMC).

4. The system as claimed in claim 1, wherein for each of the components corresponding to the slots, the component information further comprises at least one of presence information indicating presence or absence of the component, and identifier information indicating a type of the component.

5. The system as claimed in claim 1, wherein the status of each of the components corresponding to the slots further comprises at least one of functional status and health status.

6. The system as claimed in claim 1, wherein the components corresponding to the slots on the baseboard of the host computer comprise at least one of the CPU, at least one memory module, at least one peripheral component interconnect (PCI) module, at least one storage device, and at least one power supply unit (PSU).

7. The system as claimed in claim 1, wherein the host computer comprises a BIOS chip storing the BIOS and the component information, wherein the BIOS, when executed at the CPU, is configured to
detect each of the components corresponding to the slots, and receive corresponding information for each of the components corresponding to the slots,
store corresponding information for each of the components corresponding to the slots in the BIOS chip as the component information, and
retrieve the component information from the BIOS chip, and send the component information to the SP through the communication interface.

8. The system as claimed in claim 7, wherein the BIOS is configured to send the component information to the SP in a form of a first IPMI original equipment manufacturer (OEM) message.

9. The system as claimed in claim 8, wherein the code is configured to receive the component information by:
receiving the first IPMI OEM message, and
retrieving the component information from the first IPMI OEM message.

10. The system as claimed in claim 7, wherein the remote management computer comprises a graphical user interface (GUI), wherein the GUI is configured to
receive an input command to display the physical layout,
in response to the input command, generate the instruction to display the physical layout, and send the instruction to the SP,
receive the display information from the SP, and
display the graphical diagram of the physical layout on the display device based on the display information.

11. A method of generating a graphical diagram of a physical layout of slots on a baseboard of a host computer corresponding to components on the baseboard, comprising:
receiving, at a service processor (SP), component information of components corresponding to the slots on the baseboard of the host computer from a basic input/output system (BIOS) being executed at a central processing unit (CPU) of the host computer through a communication interface, wherein the slots on the baseboard corresponding to the components are displayable in the physical layout of the slots on the baseboard of the host computer;
storing, at the SP, the received component information in a non-volatile memory of the SP;
in response to an instruction to display the physical layout, retrieving, by the SP, the component information for each of the components corresponding to the slots stored in the non-volatile memory, and generating corresponding display information for each of the slots corresponding respectively to each of the components corresponding to the slots based on the retrieved component information; and
sending, by the SP, the display information to a remote management computer to display a graphical diagram of the physical layout on a display device at the remote management computer,
wherein for each of the components corresponding to the slots, the component information comprises status information indicating a status of the component, and the status of each of the components corresponding to the slots comprises enabling status.

12. The method as claimed in claim 11, wherein for each of the components corresponding to the slots, the component information further comprises at least one of presence information indicating presence or absence of the component, and identifier information indicating a type of the component.

13. The method as claimed in claim 11, wherein the status of each of the components corresponding to the slots further comprises at least one of functional status and health status.

14. The method as claimed in claim 11, wherein the components corresponding to the slots of the host computer comprise at least one of the CPU, at least one memory module, at least one peripheral component interconnect (PCI) module, at least one storage device, and at least one power supply unit (PSU).

15. The method as claimed in claim 11, wherein the host computer comprises a BIOS chip storing the BIOS and the component information, wherein the BIOS, when executed at the CPU, is configured to
    detect each of the components corresponding to the slots, and receive corresponding information for each of the components corresponding to the slots,
    store corresponding information for each of the components corresponding to the slots in the BIOS chip as the component information, and
    retrieve the component information from the BIOS chip, and send the component information to the SP through the communication interface.

16. The method as claimed in claim 15, wherein the BIOS is configured to send the component information to the SP in a form of a first Intelligent Platform Management Interface (IPMI) original equipment manufacturer (OEM) message.

17. The method as claimed in claim 16, wherein the SP is configured to receive the component information by:
    receiving the first IPMI OEM message, and
    retrieving the component information from the first IPMI OEM message.

18. The method as claimed in claim 11, wherein the remote management computer comprises a graphical user interface (GUI), wherein the GUI is configured to
    receive an input command to display the physical layout,
    in response to the input command, generate the instruction to display the physical layout, and send the instruction to the SP,
    receive the display information from the SP, and
    display the graphical diagram of the physical layout on the display device based on the display information.

19. A non-transitory computer readable medium storing computer executable code, wherein the code, when executed at a processor of a service processor (SP), is configured to:
    receive, at the SP, component information of components corresponding to slots on a baseboard of a host computer from a basic input/output system (BIOS) being executed at a central processing unit (CPU) of the host computer through the communication interface, wherein the slots on the baseboard corresponding to the components are displayable in a physical layout of the slots on the baseboard of the host computer;
    store, at the SP, the received component information in a non-volatile memory of the SP;
    in response to an instruction to display the physical layout, retrieve, by the SP, the component information for each of the components stored in the non-volatile memory, and generate corresponding display information for each of the slots corresponding respectively to each of the components based on the retrieved component information; and
    send, by the SP, the display information to a remote management computer to display a graphical diagram of the physical layout on a display device at the remote management computer,
    wherein for each of the components corresponding to the slots, the component information comprises status information indicating a status of the component, and the status of each of the components corresponding to the slots comprises enabling status.

20. The non-transitory computer readable medium as claimed in claim 19, wherein for each of the components corresponding to the slots, the component information further comprises at least one of presence information indicating presence or absence of the component, and identifier information indicating a type of the component.

21. The non-transitory computer readable medium as claimed in claim 19, wherein the status of each of the components corresponding to the slots further comprises at least one of functional status and health status.

22. The non-transitory computer readable medium as claimed in claim 19, wherein the components corresponding to the slots on the baseboard of the host computer comprise at least one of the CPU, at least one memory module, at least one peripheral component interconnect (PCI) module, at least one storage device, and at least one power supply unit (PSU).

23. The non-transitory computer readable medium as claimed in claim 19, wherein the host computer comprises a BIOS chip storing the BIOS and the component information, wherein the BIOS, when executed at the CPU, is configured to
    detect each of the components corresponding to the slots, and receive corresponding information for each of the components corresponding to the slots,
    store corresponding information for each of the components corresponding to the slots in the BIOS chip as the component information, and
    retrieve the component information from the BIOS chip, and send the component information to the SP through the communication interface.

24. The non-transitory computer readable medium as claimed in claim 23, wherein the BIOS is configured to send the component information to the SP in a form of a first Intelligent Platform Management Interface (IPMI) original equipment manufacturer (OEM) message.

25. The non-transitory computer readable medium as claimed in claim 24, wherein the code is configured to receive the component information by:
    receiving the first IPMI OEM message, and retrieving the component information from the first IPMI OEM message.

26. The non-transitory computer readable medium as claimed in claim 19, wherein the remote management computer comprises a graphical user interface (GUI), wherein the GUI is configured to
    receive an input command to display the physical layout,
    in response to the input command, generate the instruction to display the physical layout, and send the instruction to the SP,
    receive the display information from the SP, and
    display the graphical diagram of the physical layout on the display device based on the display information.

\* \* \* \* \*